United States Patent
Watanabe et al.

(10) Patent No.: US 12,469,129 B2
(45) Date of Patent: Nov. 11, 2025

(54) PREDICTION DEVICE, PREDICTION SYSTEM, CONTROL METHOD, AND CONTROL PROGRAM

(71) Applicants: KYOCERA Corporation, Kyoto (JP); THE UNIVERSITY OF TOKYO, Tokyo (JP)

(72) Inventors: Kenichi Watanabe, Tokyo (JP); Masayuki Kyomoto, Ritto (JP); Masahiko Hashida, Toyonaka (JP); Shintaro Honda, Tokyo (JP); Takashi Sasaki, Chigasaki (JP); Toru Moro, Tokyo (JP); Sakae Tanaka, Tokyo (JP)

(73) Assignees: KYOCERA Corporation, Kyoto (JP); The University of Tokyo, Tokyo (JP)

( * ) Notice: Subject to any disclaimer, the term of this patent is extended or adjusted under 35 U.S.C. 154(b) by 495 days.

(21) Appl. No.: 17/911,066

(22) PCT Filed: Mar. 12, 2021

(86) PCT No.: PCT/JP2021/009963
§ 371 (c)(1),
(2) Date: Sep. 12, 2022

(87) PCT Pub. No.: WO2021/182595
PCT Pub. Date: Sep. 16, 2021

(65) Prior Publication Data
US 2023/0111852 A1   Apr. 13, 2023

(30) Foreign Application Priority Data
Mar. 13, 2020   (JP) .................. 2020-044699

(51) Int. Cl.
*G06T 7/00*   (2017.01)
*G06V 10/82*  (2022.01)

(52) U.S. Cl.
CPC ............ *G06T 7/0012* (2013.01); *G06V 10/82* (2022.01); *G06T 2207/10081* (2013.01); *G06T 2207/10088* (2013.01); *G06T 2207/10132* (2013.01)

(58) Field of Classification Search
CPC .............................. G06T 7/0012; G06V 10/82
See application file for complete search history.

(56) References Cited

U.S. PATENT DOCUMENTS 9,042,952 B2 * 5/2015  Lynn .................. A61B 5/087
                                                    600/324
9,468,378 B2 * 10/2016 Lynn .................. A61B 5/412
(Continued)

FOREIGN PATENT DOCUMENTS

| JP | 2004-105738 A | 4/2004 |
| JP | 2008-36068 A  | 2/2008 |
| JP | 2009-515594 A | 4/2009 |

OTHER PUBLICATIONS

Guan B et al. "Deep learning risk assessment models for predicting progression of radiographic medial joint space loss over a 48-Month follow-up period", Osteoarthritis and Cartilage, Elsevier, Amsterdam, NL, vol. 28, No. 4, Feb. 6, 2020 (Feb. 6, 2020), pp. 428-437, XP086102253, ISSN: 1063-4584, DOI: 10.1016/J.JOCA.2020.01.010 [retrieved on Feb. 5, 2020].

(Continued)

*Primary Examiner* — Kevin Ky
(74) *Attorney, Agent, or Firm* — Procopio, Cory, Hargreaves & Savitch LLP

(57) ABSTRACT

A prediction device includes a first prediction unit that outputs first prediction information regarding a joint at a second point in time after a predetermined period of time from a first point in time, from a medical image showing the joint of a subject at the first point in time. The first prediction (Continued)

unit includes a first prediction model capable of estimating the first prediction information from the medical image.

18 Claims, 9 Drawing Sheets

(56) References Cited

U.S. PATENT DOCUMENTS

| | | | |
|---|---|---|---|
| 9,521,971 B2* | 12/2016 | Lynn | A61B 5/0205 |
| 2004/0059223 A1 | 3/2004 | Faulkner et al. | |
| 2010/0310141 A1 | 12/2010 | Wilson | |
| 2012/0078064 A1* | 3/2012 | Bardy | A61B 5/361 600/300 |
| 2012/0143038 A1* | 6/2012 | Georgopoulos | A61B 5/245 702/19 |
| 2013/0137962 A1* | 5/2013 | Urish | A61B 5/7264 600/410 |
| 2014/0155784 A1* | 6/2014 | Smith | G06F 18/2111 600/595 |
| 2014/0364721 A1* | 12/2014 | Lee | A61B 5/055 600/411 |
| 2017/0249434 A1* | 8/2017 | Brunner | G16H 50/30 |
| 2019/0147128 A1 | 5/2019 | O'Connor | |
| 2019/0232047 A1* | 8/2019 | Chu | A61H 23/00 |
| 2019/0321583 A1* | 10/2019 | Poltorak | A61M 21/02 |
| 2019/0336097 A1 | 11/2019 | Bregman-Amitai et al. | |
| 2020/0075165 A1 | 3/2020 | Lieberman | |
| 2020/0077892 A1* | 3/2020 | Tran | G08B 21/02 |
| 2020/0268448 A1* | 8/2020 | Weir | G06N 3/08 |

OTHER PUBLICATIONS

Tiulpin et al. "Multimodal Machine Learning-based Knee Osteoarthritis Progression Prediction from Plain Radiographs and Clinical Data", Scientific Reports, [Online] vol. 9, No. 1, Dec. 27, 2019 (Dec. 27, 2019), pp. 1-11, XP093133406, US ISSN: 2045-2322, DOI: 10.1038/541598-019-56527-3, 11 pages.

Joseph et al "Tool for osteoarthritis risk prediction (TOARP) over 8 years using baseline clinical data, X-ray, and MR imaging—Data from the osteoarthritis initiative", Journal of Magnetic Resonance Imaging, [Online] vol. 47, No. 6, Jun. 30, 2018 (Jun. 30, 2018), pp. 1517-1526, XP093133405, USISSN: 1053-1807, DOI: 10.1002/jmri.25892, 20 pages.

* cited by examiner

PREDICTION DEVICE, PREDICTION SYSTEM, CONTROL METHOD, AND CONTROL PROGRAM

TECHNICAL FIELD

The present disclosure relates to a prediction device, a prediction system, a control method, and a control program for predicting joint-related symptoms and the like.

BACKGROUND OF INVENTION

Patent Document 1 discloses a technique for determining osteoporosis.

CITATION LIST

Patent Literature

Patent Document 1: JP 2008-36068 A

SUMMARY

A prediction device according to one aspect of the present disclosure includes an image acquirer configured to acquire a medical image showing a joint (including bone, cartilage, and soft tissue) of a subject at a first point in time, and a first prediction unit configured to output first prediction information regarding the joint at a second point in time after a predetermined period of time from the first point in time, from the medical image, in which the first prediction unit includes a first prediction model configured to estimate the first prediction information from the medical image.

A control method according to one aspect of the present disclosure is a control method executed by a computer, the control method including acquiring a medical image showing the joint of a subject at a first point in time and outputting first prediction information regarding the joint at a second point in time after a predetermined period of time from the first point in time, from the medical image, in which the computer includes a first prediction model configured to estimate the first prediction information from the medical image.

A prediction device according to each aspect of the present disclosure may be implemented by a computer. In this case, a control program of the prediction device configured to cause a computer to implement the prediction device by causing the computer to operate as each unit (software element) included in the prediction device, and a computer-readable recording medium recording the control program are also included within the scope of the present disclosure.

DESCRIPTION OF EMBODIMENTS

Figure 1:
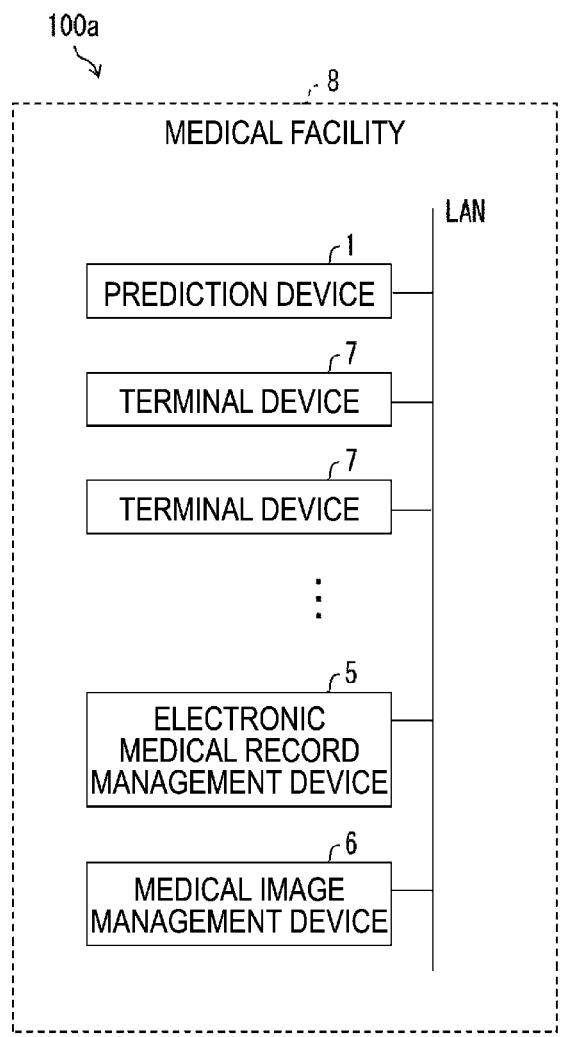
FIG. 1 is a diagram illustrating a configuration example of a prediction system according to an aspect of the present disclosure.

The present disclosure will be described in detail below.

Disease of a joint of a subject can significantly reduce the quality of life (QOL) of the subject. In order to reduce the decrease in QOL due to the disease of the joint of the subject, it is important to detect the onset of the disease and the progression of symptoms as soon as possible and to initiate intervention, such as lifestyle guidance, in an appropriate manner. For this, in an aspect of the present disclosure, reliable information regarding the onset of the disease or the progression stage of the joint-related symptoms of the subject can be presented. Accordingly, in the aspect of the present disclosure, the decrease in the QOL of the subject can be reduced.

Embodiments according to the present disclosure will be described below. Note that in the following description, when the subject is a human, the subject is described as a "human subject", but the subject is not limited to humans. The subject may be a mammal other than humans, such as Equidae, Felidae, Canidae, Bovidae, or Sus scrofa domesticus. The present disclosure also includes embodiments in which "human subject" is reworded as "animal" when the embodiments are applicable to any of these animals.

First Embodiment

Overview of Prediction Device 1

In the aspect of the present disclosure, a prediction device 1 is a device that outputs first prediction information regarding a future joint-related symptom of the human subject from the medical image showing the joint of the human subject at a first point in time using a first prediction model. Here, the first prediction model is a prediction model capable of estimating the first prediction information from the medical image.

The first point in time may be, for example, a point in time when a medical image of a joint of the human subject is acquired. The first point in time may typically be a point in time when a medical image of a present condition of the joint of the human subject is acquired. That is, the first point in time may be intended to be substantially the present point in time.

The first prediction information is information regarding the joint-related symptom of the human subject at a second point in time after a predetermined period of time from the first point in time. The predetermined period of time may be any period of time from the first point in time, and may be 6 months, 1 year, 5 years, 10 years, or 50 years. That is, the second point in time may be intended to be substantially any point in time in the future. The predetermined period of time is not limited to one period, and may include a plurality of periods. That is, the first prediction information may include information indicating the joint-related symptom of the human subject at a plurality of points in time, such as 6 months, 1 year, 5 years, 10 years, and 50 years after the first point in time. The first prediction information is, for example, information containing predictions regarding a symptom likely to occur in the joint of the human subject at a future point in time, when the symptom is to occur, and the progression stage of the symptom in the joint of the human subject.

More specifically, the first prediction information may contain, as symptoms that are likely to occur in the joint of the human subject, information of, for example, periarticular alignment, articular cartilage thickness, joint fissure, osteophyte formation, presence or absence of synovitis, Kellgren-Laurence (KL) classification, articular range of motion, joint stiffness, and presence or absence of claudication.

The prediction device 1 can present information regarding the symptoms of diseases that may occur in the joint of the human subject in the future (e.g., osteoarthritis, rheumatoid arthritis, avascular necrosis, and other joint-specific diseases) to the human subject and a doctor in charge of the human subject at a time when the symptoms have not occurred yet.

The prediction device 1 is capable of outputting the first prediction information for the joint of the human subject, including any one of the temporomandibular joint, spinal intervertebral joint, shoulder joint, acromioclavicular joint, elbow joint, wrist joint, hand, finger, hip joint, sacroiliac joint, knee joint, ankle joint, foot, and toe.

The prediction device 1 can use any medical images capable of being analyzed for the shape and arrangement of bones constituting the joint, an angle formed by bones forming the joint, the condition of surrounding soft tissue, and the like of the human subject to be predicted. Hence, the medical images may include, for example, at least one selected from the group consisting of a simple X-ray image, a computed tomography (CT) image, a magnetic resonance imaging (MRI) image, and an ultrasound image.

Configuration of Prediction System 100a

First, in the aspect of the present disclosure, a configuration of a prediction system 100a is described with reference to FIG. 1. FIG. 1 is a diagram illustrating a configuration example of the prediction system 100a in a medical facility 8 in which the prediction device 1 is introduced.

The prediction system 100a includes the prediction device 1 and one or more terminal devices 7 communicably connected to the prediction device 1. The prediction device 1 is a computer that outputs first prediction information from a medical image showing the joint of a human subject and transmits the first prediction information to the terminal device 7. The terminal device 7 receives the first prediction information from the prediction device 1 and presents the first prediction information. The terminal device 7 is a computer used by medical personnel such as a doctor belonging to the medical facility 8. The terminal device 7 is, for example, a personal computer, a tablet terminal, or a smartphone. The terminal device 7 includes a communicator for transmitting and receiving data to and from another device, an input unit such as a keyboard and a microphone, a display capable of displaying information contained in the first prediction information, and an output unit such as a speaker. An example is illustrated in which a local area network (LAN) is disposed and the prediction device 1 and the terminal devices 7 are connected to the LAN in the medical facility 8 illustrated in FIG. 1, but the network is not limited thereto. Examples of the network in the medical facility 8 include the Internet, a telephone communication line network, an optical fiber communication network, a cable communication network, and a satellite communication network.

In addition to the prediction device 1 and the terminal devices 7, a medical image management device 6 may be communicably connected to the LAN in the medical facility 8. The medical image management device 6 is a computer that functions as a server for managing medical images taken in the medical facility 8. In this case, the prediction device 1 may acquire a medical image showing the joint of the human subject from the medical image management device 6.

The LAN in the medical facility 8 may be communicably connected to an external communication network. In the medical facility 8, the prediction device 1 and the terminal device 7 may be directly connected to each other without going through the LAN.

Configuration of Prediction System 100b

Figure 2:
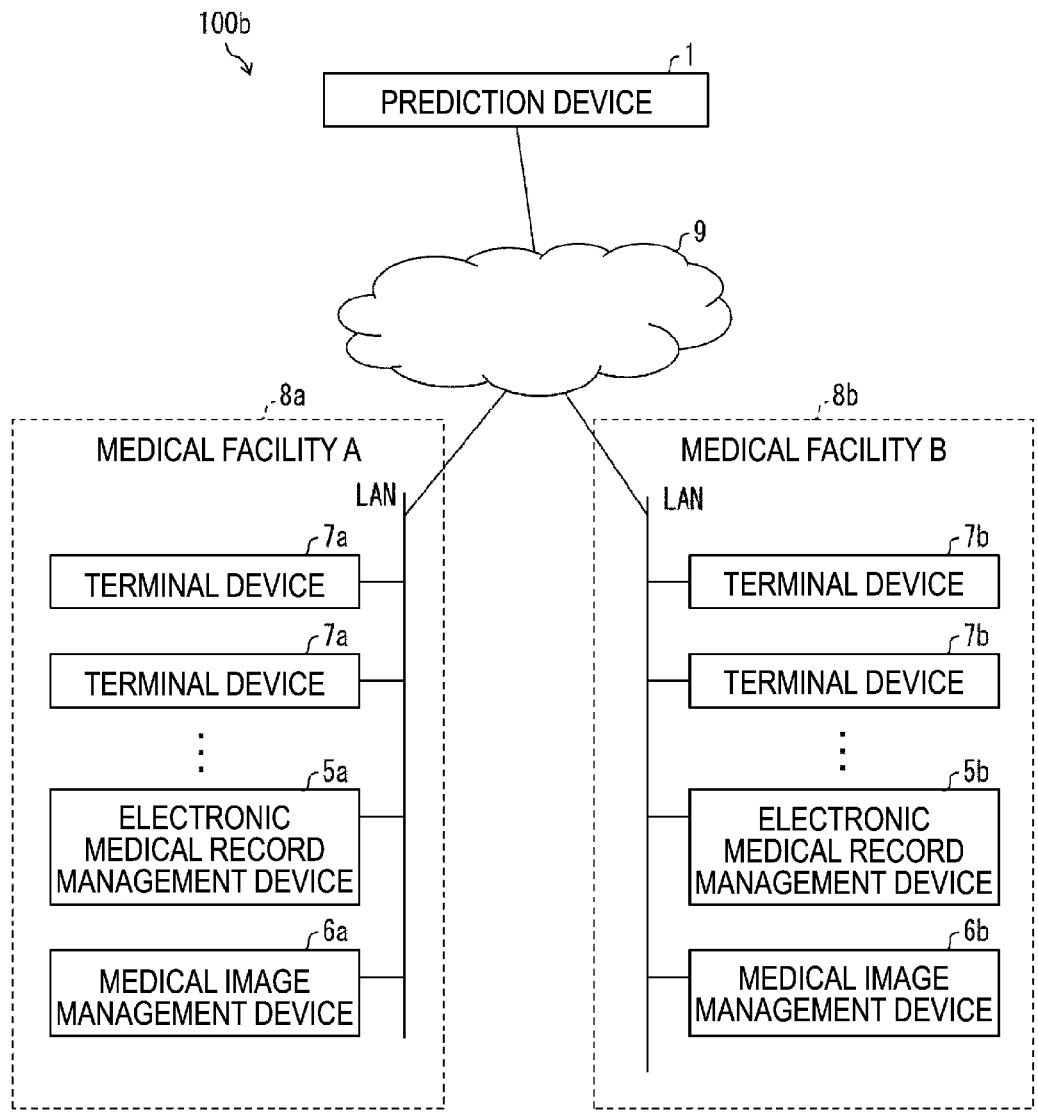
FIG. 2 is a diagram illustrating a configuration example of a prediction system according to another aspect of the present disclosure.

The prediction device 1 may be communicably connected to LANs individually disposed in a plurality of medical facilities 8 via a communication network 9 instead of a computer installed in a predetermined medical facility 8. FIG. 2 is a diagram illustrating a configuration example of a prediction system 100b according to another aspect of the present disclosure.

In addition to one or more terminal devices 7a, an electronic medical record management device 5a and a medical image management device 6a may be communicably connected to a LAN in a medical facility 8a. In addition to terminal devices 7b, an electronic medical record management device 5b and a medical image management device 6b may be communicably connected to a LAN in a medical facility 8b. In the following, when no particular distinction is made between the medical facilities 8a and 8b, each of them is referred to as a "medical facility 8". Each of the terminal devices 7a and 7b and each of the medical image management devices 6a and 6b are referred to as a "terminal device 7", and a "medical image management device 6", respectively, when distinction is unnecessary.

FIG. 2 illustrates an example in which the LANs in the medical facility 8a and the medical facility 8b are connected to the communication network 9. The prediction device 1 is not limited to the configuration illustrated in FIG. 2, as long as the prediction device 1 is communicably connected to the devices in the individual medical facilities via the communication network 9. For example, the prediction device 1 may be installed in the medical facility 8a or in the medical facility 8b.

In the prediction system 100b employing such a configuration, the prediction device 1 can acquire a medical image of a human subject Pa examined in the medical facility 8a from the medical image management device 6a in the medical facility 8a. The prediction device 1 transmits first prediction information regarding the joint of the human subject Pa to the terminal device 7a installed in the medical facility 8a. In the same or similar manner, the prediction device 1 can acquire a medical image of a human subject Pb examined in the medical facility 8b and can transmit first prediction information regarding the joint of the human subject Pb to the terminal device 7b installed in the medical facility 8b.

In this case, the medical image of each human subject may contain identification information unique to each medical facility 8 (e.g., facility ID) assigned to each medical facility 8 where each human subject is examined, and identification information unique to each human subject (e.g., patient ID) assigned to each human subject. Based on these pieces of identification information, the prediction device 1 can correctly transmit the first prediction information output from the medical image regarding the human subject to the terminal device 7 of each medical facility 8 where the human subject is examined.

Configuration of Prediction Device 1

Figure 3:
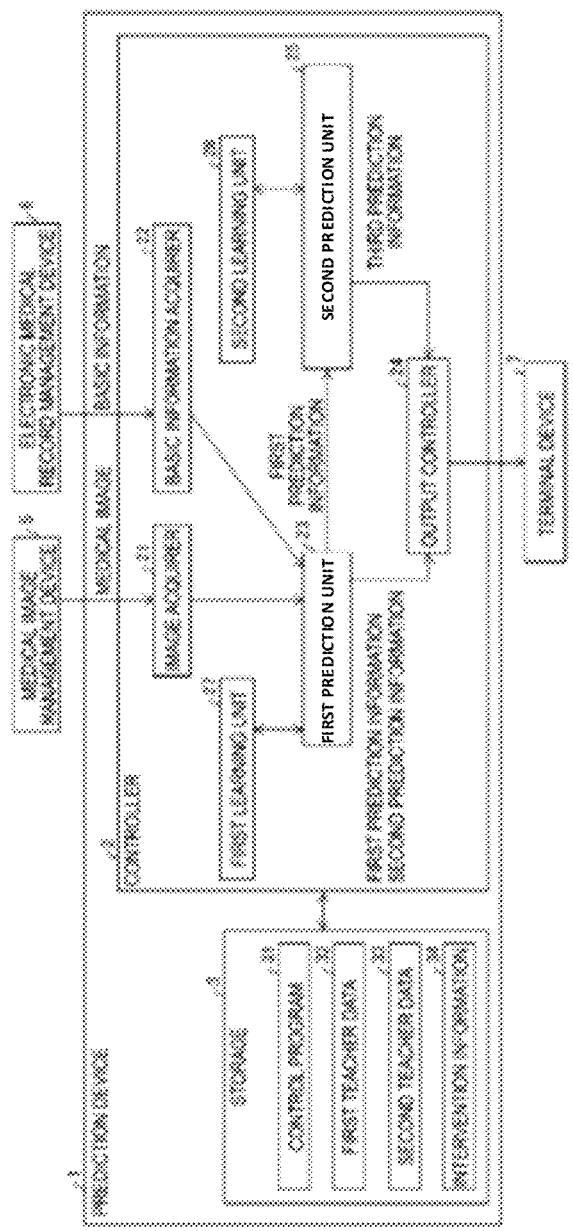
FIG. 3 is a block diagram illustrating an example of a configuration of a prediction device according to the aspect of the present disclosure.

A configuration of the prediction device 1 applied to the prediction system 100a illustrated in FIG. 1 is described with reference to FIG. 3. FIG. 3 is a block diagram illustrating an example of a configuration example of the prediction device 1.

The prediction device 1 includes a controller 2 that comprehensively controls each unit of the prediction device 1, and storage 3 that stores various data to be used by the controller 2. The controller 2 includes an image acquirer 21, a first prediction unit 23, an output controller 24, a second prediction unit 25, a first learning unit 27, and a second learning unit 28. The storage 3 stores a control program 31, which is a program for executing various controls of the prediction device 1, first learning data 32 (patient information), and second learning data 33 (effect information).

Image Acquirer 21

The image acquirer 21 acquires, from the medical image management device 6, a medical image, which is an image showing the joint of the human subject at the first point in time. The medical image is input data input to the first prediction unit 23.

First Prediction Unit 23

The first prediction unit 23, from the medical image showing the joint of the human subject, outputs the first prediction information regarding the joint at the second point in time in which a predetermined period of time from the first point in time. The first prediction unit 23 includes a trained neural network including an input layer 231 and an output layer 232 (see FIG. 4).

The first prediction unit 23 includes the neural network trained using the first learning data 32, which is time series data regarding joint-related symptoms acquired from a plurality of individual patients at a plurality of points in time in the past. The trained neural network is used as a first prediction model capable of outputting the first prediction information from the medical image of the human subject. Note that the neural network is a mathematical model that imitates the human cranial nervous system, and can predict the prediction information by determining various parameters of the mathematical model by learning processing, and executing operations according to the trained mathematical model or a calculation equation.

Figure 4:
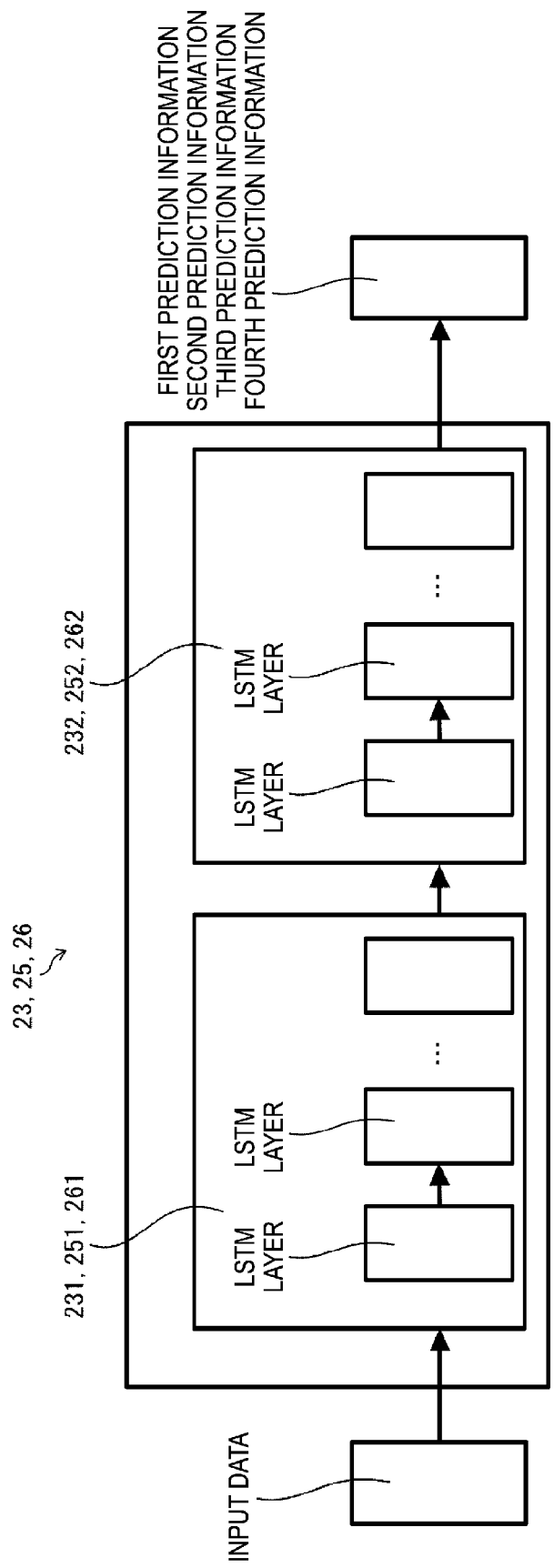
FIG. 4 is a diagram illustrating an example of a configuration of a neural network included in a first prediction unit, a second prediction unit, and a third prediction unit.

The first prediction unit 23, in response to the medical image of the human subject being input to the input layer 231 (see FIG. 4), executes operations based on the first prediction model and outputs the first prediction information from the output layer 232 (see FIG. 4). As an example, the first prediction unit 23 may be configured to extract a feature from a medical image and use the feature as input data. Known algorithms, such as those listed below, can be applied to extract the feature.

Convolutional neural network (CNN)
Auto encoder
Recurrent neural network (RNN)
Long short-term memory (LSTM)

The first prediction model is a calculation model used by the first prediction unit 23 when executing operations based on the input data. The first prediction model is generated by executing machine learning using the first learning data 32, which will be described later, on the neural network included in the first prediction unit 23. The first learning data 32, a configuration of the first prediction unit 23, and a specific example of the learning processing will be described later.

Second Prediction Unit 25

Same as or similar to the first prediction unit 23, the second prediction unit 25 includes a trained neural network including an input layer 251 and an output layer 252 (see FIG. 4).

The second prediction unit 25 includes the neural network trained using the second learning data 33 containing time series data regarding the joint-related symptoms acquired from a plurality of individual patients to whom interventions were applied at a plurality of points in time in the past. The trained neural network is used as a second prediction model capable of estimating third prediction information from the first prediction information of the human subject. Here, the second prediction model is a prediction model generated based on the time series data regarding the joint-related symptoms acquired from the plurality of individual patients to whom the interventions were applied.

The third prediction information is information indicating a method of intervention in the human subject and an effect of the intervention. More specifically, the third prediction information is information indicating the type of intervention and the effect of the intervention. The effect of the intervention is information representing the joint-related symptom of the human subject at the second point in time when the intervention is applied. The effect of the intervention may be information representing a degree of improvement in the symptom of the disease or a degree of suppression of the progression of the joint-related symptom regarding of the human subject at the second point in time by applying the intervention as compared with a case where the intervention is not applied. The third prediction information may contain information indicating when the intervention is applied (intervention time).

The second prediction unit 25 executes operations based on the second prediction model in response to the first prediction information being input to the input layer 251 (see FIG. 4), and outputs the third prediction information from the output layer 252 (see FIG. 4). As an example, the second prediction unit 25 may be configured to extract a feature from the first prediction information and use the feature as input data. Known algorithms, such as those listed below, can be applied to extract the feature.

Convolutional neural network (CNN)
Auto encoder
Recurrent neural network (RNN)
Long short-term memory (LSTM)

The second prediction model is a calculation model used by the second prediction unit 25 when executing operations based on the input data. The second prediction model is generated by executing machine learning using the second learning data 33, which will be described later, on the neural network included in the second prediction unit 25. The second learning data 33, a configuration of the second prediction unit 25, and a specific example of the learning processing will be described later.

Output Controller 24

The output controller 24 transmits the first prediction information output from the first prediction unit 23 to the terminal device 7. Also, the output controller 24 transmits the third prediction information output from the second prediction unit 25 to the terminal device 7.

The prediction device 1 may include a display (not illustrated). In that case, the output controller 24 displays the first prediction information on the display.

First Learning Unit 27

The first learning unit 27 controls learning processing for the neural network included in the first prediction unit 23. The first learning data 32 (described later) is used for this learning. A specific example of learning executed by the first learning unit 27 will be described later.

Second Learning Unit 28

The second learning unit 28 controls learning processing for the neural network included in the second prediction unit 25. The second learning data 33 (described later) is used for this learning. A specific example of learning executed by the second learning unit will be described later.

First Learning Data 32

The first learning data 32 is data used for machine learning for generating the first prediction model. The first learning data 32 contains first learning input data 321 used as input data and first teacher data 322 for calculating an error with the first prediction information output by the first prediction unit 23.

For example, the first learning input data 321 may contain patient images showing bones, joints, and soft tissues of the plurality of individual patients. The first teacher data 322 may contain symptom information regarding the joints of individual patients at the points in time the patient images were taken. Here, the symptom information may contain information regarding the onset of disease of the joint or the progression of a symptom. The patient image may include at least one selected from the group consisting of an X-ray image, a CT image, an MRI image, and an ultrasound image showing the joint of each of the plurality of patients.

The first learning data 32 may be data in which the first learning input data 321 and the first teacher data 322 are integrated. In other words, the first learning data 32 may be time series data in which the patient images acquired from the plurality of individual patients at a plurality of points in time in the past are associated with information regarding the joint-related symptoms at the points in time when the patient images were taken. For example, the first learning data 32 may contain parameters representing features extracted from information of periarticular alignment, articular cartilage thickness, osteophyte formation, presence or absence of synovitis, KL classification, articular range of motion, degree of pain, degree of joint stiffness, presence or absence of claudication, and the like of the patient at a certain point in time and one year after the certain point in time. The first learning data 32 may also contain parameters indicating attributes of the patient. The attributes of the patient are, for example, height, weight, age, and gender of each patient. When the first learning data is time series data, the first learning unit 27 may use a patient image at a certain point in time as the first learning input data 321, and may use a patient image after a predetermined period from the certain point in time, information regarding a symptom related to the joint at the time the patient image was taken and information regarding the patient as the first teacher data 322.

The first learning data 32 may contain information regarding the QOL of the plurality of individual patients in the time series data. For example, the first learning data 32 may contain information of WOMAC SF-36, or VAS. The first prediction unit 23 including the first prediction model generated by the machine learning using the first learning data 32 can output second prediction information regarding the QOL of the human subject at the second point in time from the medical image of the human subject.

Second Learning Data 33

The second learning data 33 (effect information) is data used for machine learning for generating the second prediction model. The second learning data 33 contains second learning input data 331 used as input data and second teacher data 332 for calculating an error with the first prediction information output by the first prediction unit 23. Specifically, the second learning input data 331 may contain, for the plurality of individual patients to whom the interventions were applied, information indicating when the interventions were applied, patient images showing the joints of the individual patients, and symptom information regarding the onsets or progressions of the joint-related symptoms at the points in time the patient images of individual patients were taken. Further, the second teacher data 332 may contain patient images showing the joints of the patients and symptom information regarding the onsets or progressions of the joint-related symptoms of the patients, at the points in time after the points in time the patient images described above were taken (e.g., one year later).

The second learning data 33 may be time series data in which the patient images acquired from the plurality of individual patients to whom the interventions were applied in the past are associated with information regarding the joint-related symptoms at the points in time when the patient images were taken.

Configurations of First Prediction Unit 23 and Second Prediction Unit 25

Configurations of the first prediction unit 23 and the second prediction unit 25 will be described below with reference to FIG. 4. The configuration illustrated in FIG. 4 is an example, and the configurations of the first prediction unit 23 and the second prediction unit 25 are not limited thereto. The first prediction unit 23 may have the same or similar configuration as the second prediction unit 25.

Configuration of First Prediction Unit 23

As illustrated in FIG. 4, the first prediction unit 23 and the second prediction unit 25 execute operations based on the first prediction model on the input data input to the input layer 231 and output the first prediction information from the output layer 232. The first prediction unit 23 may output the second prediction information in addition to the first prediction information.

In FIG. 4, the first prediction unit 23 includes a neural network including the input layer 231 and the output layer 232. The neural network is a neural network suitable for handling time series information. The neural network is, for example, an LSTM. The neural network is preferably a neural network suitable for handling time series information and position information in combination. The neural network is, for example, a ConvLSTM network, which is a combination of CNN and LSTM. The input layer 231 is capable of extracting a feature of the change in time of the input data. The output layer 232 is capable of calculating a new feature based on the feature extracted in the input layer 231 and the change in time and the initial value of the input data. Each of the input layer 231 and the output layer 232 has a plurality of LSTM layers. Each of the input layer 231 and the output layer 232 may have three or more LSTM layers. The first learning input data 321 for learning is input to the input layer 231 of the first prediction unit 23 during learning of the first prediction unit 23. The data regarding the joint-related symptom, which serves as the first teacher data 322, is compared with output data output from the output layer 232 of the first prediction unit 23 during learning of the first prediction unit 23. The first prediction unit 23 is optimized by known machine learning using the first learning input data 321 and the first teacher data 322. The first prediction unit 23 adjusts the variable parameters in the first prediction unit 23 so that a difference between a pseudo prediction result calculated from the first learning input data 321 input to the input layer 231 and output from the output layer 232 and the first teacher data 322 is reduced.

Specifically, when the first learning input data 321 is input to the input layer 231, a plurality of pixel data constituting the first learning input data 321 is input to a plurality of artificial neurons, respectively. The first prediction unit 23 adjusts the parameters so that the error between the pseudo prediction result output from the output layer 232 and the first teacher data 322 is reduced. The adjusted parameters become trained parameters, and are stored in the first prediction model or the second prediction model.

A backpropagation method, for example, is used as the method for adjusting the parameter. The parameters include, for example, the parameters used in the input layer 231 and the output layer 232. Specifically, the parameters contain weighting factors used in the LSTM layers of the input layer 231 and the output layer 232. As a result, the first prediction model executes operations based on the first prediction model on the medical image data input to the input layer 231 and outputs the first prediction information from the output layer 232. As described above, in the prediction device, the medical image data is used to train the first prediction unit 23 and to make the prediction in the first prediction unit 23. Thus, by inputting the medical image to the prediction device, the output can be used as the first prediction information regarding a future joint-related symptom.

Specifically, the input data used during learning of the first prediction unit 23 is a medical image of the patient at a certain point in time A contained in the first learning input data 321. Based on the input data described above, the first prediction unit 23 outputs, as the output data, a prediction result of the onset or the progression stage of a disease related to the joint of a patient during a predetermined period of time (e.g., three years) from the point in time A to a point in time B. Specifically, the first prediction unit 23 outputs, for example, an angle formed by the bones constituting the joint, a parameter indicating a degree of wear of the cartilage, a value indicating the class according to a stage of deformity of the joint of the patient at the point in time B, information or the like indicating the time of the onset and degree of pain in the joint of the patient, and when invasive treatment is required for the joint of the patient. The output data indicated here are examples, and are not limited thereto.

The input data used when the first prediction unit 23 outputs the first prediction information is, for example, a parameter indicating the feature extracted from the medical image of the human subject at the first point in time. Based on the input data described above, the first prediction unit 23 outputs a prediction result of the onset or the progression stage of the disease related to the joint of the human subject up to the second point in time as the first prediction information. Specifically, the first prediction unit 23 outputs, as the first prediction information, for example, an angle formed by the bones constituting the joint, a parameter indicating a degree of wear of the cartilage, a value indicating a class according to a stage of deformity of the joint of the human subject at the second point in time, information or the like indicating the time of the onset and degree of pain in the joint of the human subject, and when invasive treatment is required for the joint of the patient. The first prediction information indicated here is an example, and is not limited thereto.

Based on the first prediction information described above, the first prediction unit 23 outputs information indicating the QOL of the human subject as the second prediction information. Specifically, the first prediction unit 23 outputs at least one of the following as the second prediction information: information regarding the pain developing in the joint of the human subject, information regarding the catastrophizing of the human subject, information regarding the motor ability of the human subject, information indicating the level of life satisfaction of the human subject, and information regarding the degree of joint stiffness and the like of the human subject.

The information indicating the QOL of the human subject is information containing at least one of the following.

Information regarding the pain developing in the joint of the human subject

Information regarding catastrophizing of the human subject

Information regarding the motor ability of the human subject

Information indicating the level of life satisfaction of the human subject

The information indicating the QOL of the human subject may contain the human subject's (1) physical functionality, (2) physical role functionality, (3) bodily pain, (4) general health perceptions, (5) vitality, (6) social role functionality, (7) emotional roll functionality, and (8) mental health.

Basic information may contain information such as an articular range of motion, weight bearing index, presence or absence of claudication, KL classification, and degree of stiffness of the human subject. Information regarding QOL may contain information such as Western Ontario and McMaster Universities Osteoarthritis Index (WOMAC), 36-Item Short-Form Health Survey (SF-36), and Visual analog scale (VAS).

Configuration of Second Prediction Unit 25

The second prediction unit 25 may also include the same or similar configuration as the first prediction unit 23, and specifically includes the input layer 251 and the output layer 252. The second prediction unit 25 acquires the first prediction information from the first prediction unit 23 and uses the acquired first prediction information as input data to be input to the input layer 251. The second prediction unit 25 may further acquire a medical image and use the acquired medical image as input data. The second prediction unit 25 executes operations using the second prediction model based on the first prediction information and outputs the third prediction information.

Specifically, the input data used during the learning of the second prediction unit 25 is information indicating the information indicating the onset or the progression stage of the disease regarding the joint of the patient at a certain point in time B included in the second learning data 33 and information indicating a method of intervention contained in the intervention information 34. Based on the input data described above, the second prediction unit 25 outputs information representing the degree to which the symptom of the disease regarding the joint of the patient is improved or the degree to which the progression of the symptom is suppressed when the intervention is applied at the point in time B. More specifically, the second prediction unit 25 may output information such as what percentage of the deformity of the joint of the patient is suppressed, how many years the onset of pain can be delayed, how many years the need for surgery can be delayed, how much pain is reduced, how much walking ability (including stair climbing ability) is improved, or how much QOL is improved.

Based on the first prediction information and the information indicating the method of intervention contained in the intervention information 34, the second prediction unit 25 outputs, as the third prediction information, information representing the degree to which the symptom of the disease regarding the joint of the human subject is improved or the degree to which the progression of the symptom is suppressed when the intervention is applied.

Intervention Information 34

Returning to FIG. 3, the storage 3 stores in advance information (intervention information 34) regarding the intervention for which the second prediction unit 25 estimates an effect. Upon acquiring the first prediction information, the second prediction unit 25 refers to the storage 3, selects at least one of the methods of intervention contained in the intervention information 34, and estimates the effect of the intervention. The intervention information 34 with an estimated effect contains a non-invasive treatment such as weight restriction, heat therapy, ultrasound therapy, wearing of an orthotic device, or supplement intake (e.g., chondroitin or glucosamine). An effect of an invasive treatment, such as replacement arthroplasty, may also be estimated as the intervention information 34.

Learning Processing by First Learning Unit 27

Figure 5:
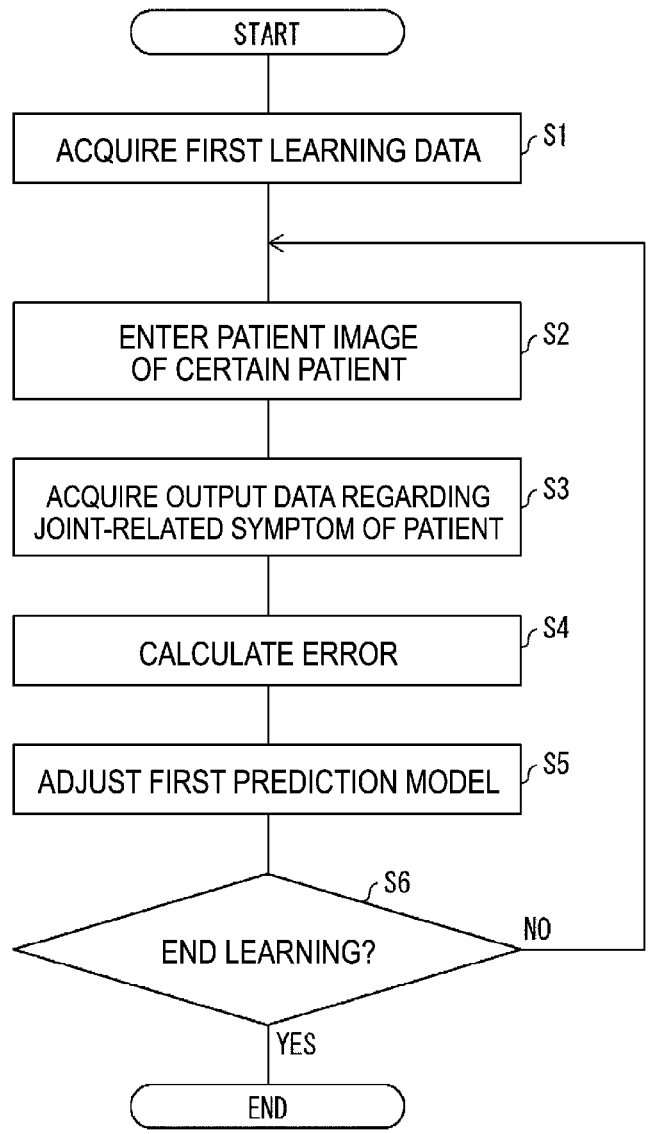
FIG. 5 is a flowchart showing an example of a flow of learning processing by a first learning unit.

Hereinafter, the learning processing of generating the first prediction model will be described with reference to FIG. 5. FIG. 5 is a flowchart showing an example of a flow of learning processing by the first learning unit 27.

The first learning unit 27 acquires the first learning input data 321 contained in the first learning data 32 from the storage 3 (step S1). The first learning input data 321 contains patient images of patients A, B, . . . .

The first learning unit 27 inputs a patient image of the patient A at the point in time A, contained in the first learning input data 321, to the input layer 231 (step S2). The input layer 231 may extract a parameter indicating a feature from the input patient image.

The first learning unit 27 acquires output data regarding the joint-related symptom of the patient A from the output layer 232 (step S3). The output data contains the same contents as the first teacher data 322.

The first learning unit 27 acquires the first learning input data 321 contained in the first learning data 32. The first learning unit 27 compares the acquired output data with the symptom information of the patient A at the point in time B contained in the first teacher data 322 and calculates an error (step S4), and the first learning unit 27 adjusts the first prediction model so that the error becomes smaller (step S5).

Any known method is applicable to adjustment of the first prediction model. For example, a backpropagation method may be employed as a method for adjusting the first prediction model. The adjusted first prediction model becomes a new first prediction model, and in subsequent operations, the first prediction unit 23 uses the new first prediction model. In the adjustment stage of the first prediction model, the parameters (e.g., filter coefficient and weighting factor) used in the first prediction unit 23 may be adjusted.

If the error is not within the predetermined range, and if the patient images of all the patients contained in the first learning data 32 are not input (NO in step S6), the first learning unit 27 returns to step S2 and repeats the learning processing. If the error is within the predetermined range, and if the patient images of all the patients contained in the first learning data 32 are input (YES in step S6), the first learning unit 27 ends the learning processing.

Learning Processing by Second Learning Unit 28

Figure 6:
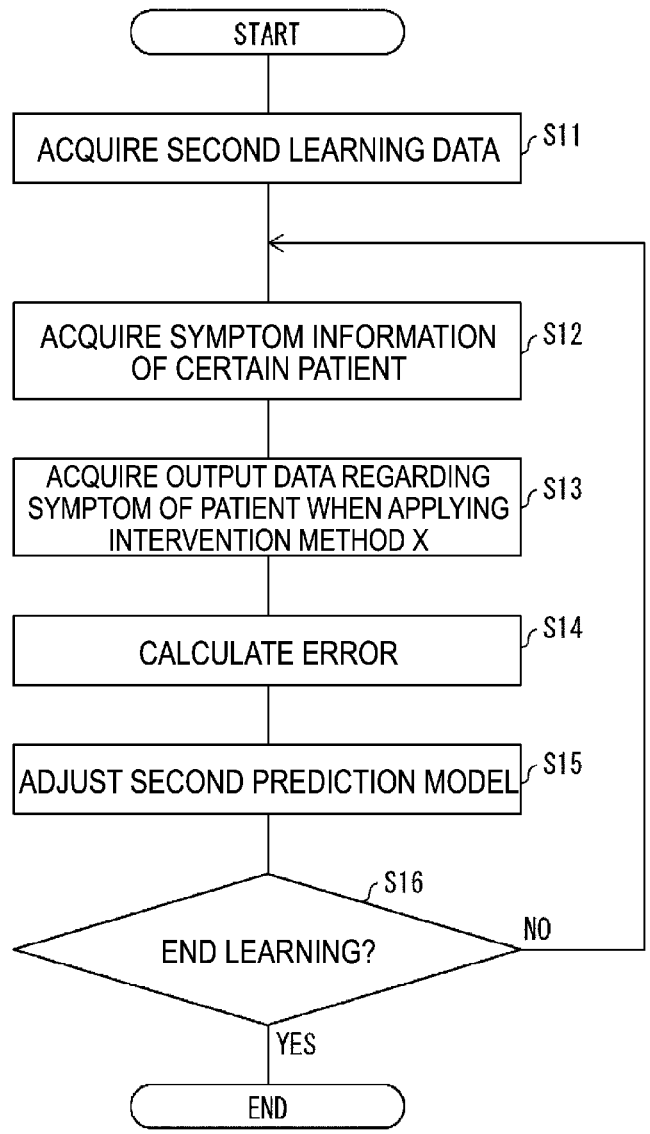
FIG. 6 is a flowchart showing an example of a flow of learning processing by a second learning unit.

The learning processing of generating the second prediction model will be described with reference to FIG. 6. FIG. 6 is a flowchart showing an example of a flow of learning processing by the second learning unit 28.

The second learning unit 28 acquires the second learning input data 331 from the storage 3 (step S11). The second learning input data 331 contains symptom information regarding the joint-related symptoms of individual patients and symptom information of the patient (patient A) to whom a certain intervention (hereinafter, intervention X) is applied.

The second learning unit 28 inputs the symptom information regarding the joint-related symptom of the patient A at the point in time B, contained in the second learning input data 331, to the input layer 231 (step S12).

The second learning unit 28 acquires output data regarding the joint-related symptom of the patient A from the output layer 232 (step S13). The output data contains the same contents as the second teacher data 332.

The second learning unit 28 acquires the second teacher data 332. The second learning unit 28 compares the acquired output data with the symptom information of the patient A to whom the intervention X was applied at the point in time B contained in the second teacher data 332 and calculates an error (step S14), and the learning unit 27 adjusts the second prediction model so that the error becomes smaller (step S15).

Any known method is applicable to adjustment of the second prediction model. For example, a backpropagation method may be employed as a method for adjusting the second prediction model. The adjusted second prediction model becomes a new second prediction model, and in subsequent operations, the second prediction unit 25 uses the new second prediction model. In the adjustment stage of the second prediction model, the parameters (e.g., filter coefficient and weighting factor) used in the first prediction unit 23 may be adjusted.

If the error is not within the predetermined range, and if the symptom information of all the patients contained in the second learning data 33 are not input (NO in step S16) the second learning unit 28 returns to step S12 and repeats the learning processing. If the error is within the predetermined range, and if the pieces of symptom information of all the patients contained in the second learning data 33 are input (YES in step S16), the second learning unit 28 ends the learning processing.

Processing of Prediction Device 1

Figure 7:
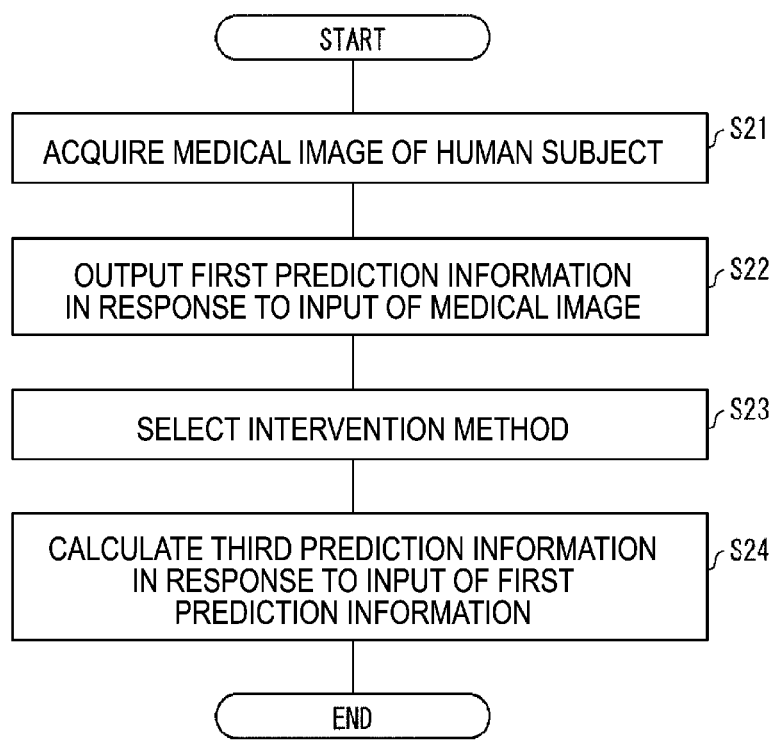
FIG. 7 is a flowchart showing an example of a flow of processing executed by the prediction device.

The flow of processing executed by the prediction device 1 will be described below with reference to FIG. 7. FIG. 7 is a flowchart showing an example of a flow of processing executed by the prediction device 1.

Output of First Prediction Information

First, the image acquirer 21 acquires a medical image (input data) from the medical image management device 6 (step S21: image acquisition step), and inputs the acquired medical image to the first prediction unit 23.

The first prediction unit 23 outputs the first prediction information in response to the input of the medical image (step S22: prediction step).

Output of Second Prediction Information

When the basic information contains information regarding the QOL of the human subject, in step S22, the first prediction unit 23 may further output the second prediction information in response to the input of the medical image.

Output of Third Prediction Information

Upon acquiring the first prediction information, the second prediction unit 25 refers to the intervention information 34 in the storage 3 and selects at least one of the methods of intervention contained in the intervention information 34 (step S23). In response to the input of the first prediction information, the second prediction unit 25 outputs the third prediction information about the selected intervention (step S24).

Medical Service Implemented by Prediction Device 1

Figure 8:
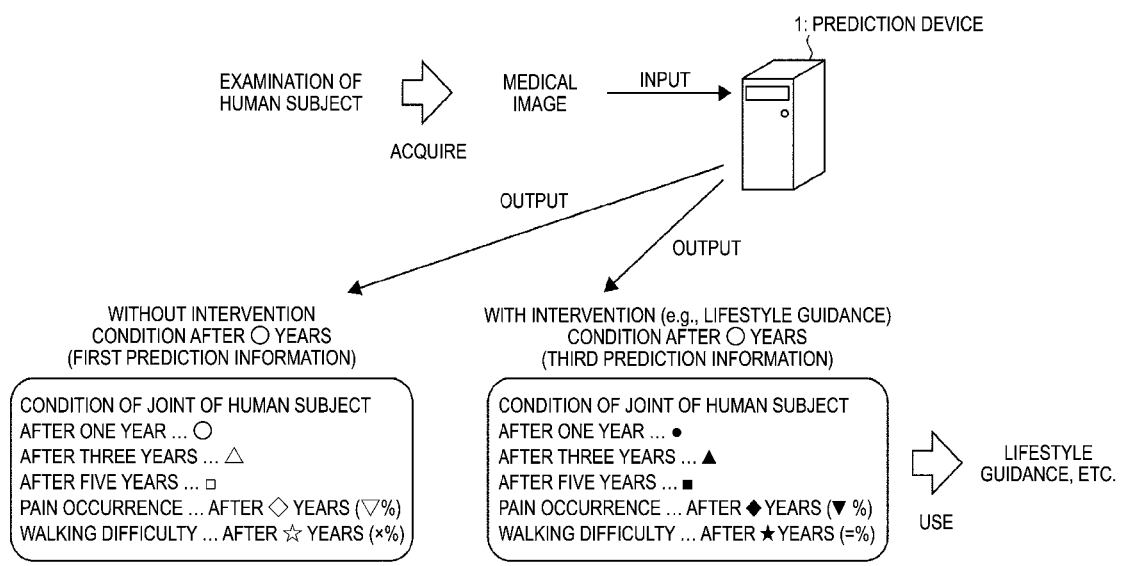
FIG. 8 is a diagram illustrating an example of a medical service provided by the prediction device.
Figure 9:
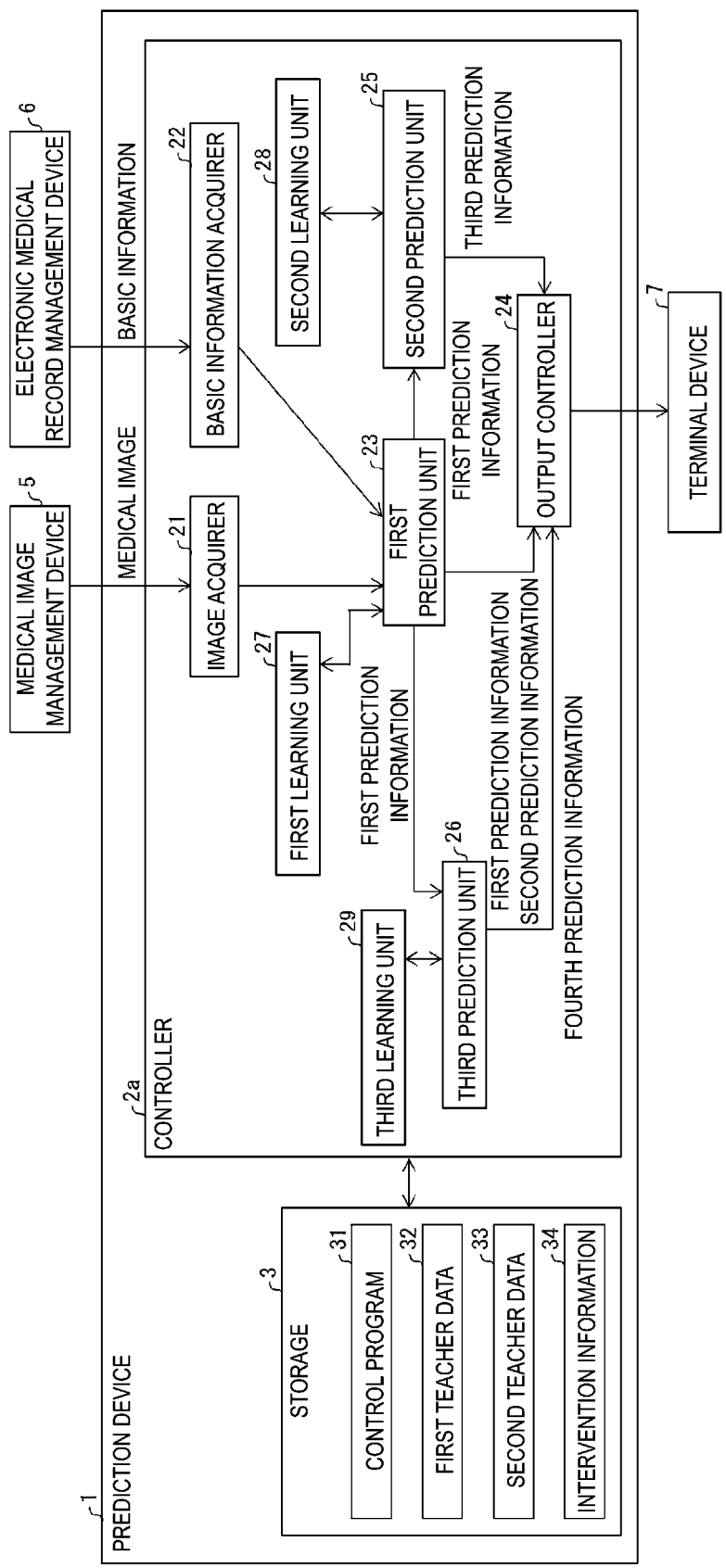
FIG. 9 is a block diagram illustrating an example of a configuration of a prediction device according to another aspect of the present disclosure.

FIG. 8 is a diagram illustrating an example of a medical service implemented by the prediction device 1.

When a human subject visits the medical facility 8 due to pain in the knee joint or the like and a joint-related disease is suspected, the doctor or the like (user) in charge of the human subject acquires an X-ray photograph (medical image) of the human subject at that point in time (first point in time). When the user inputs the acquired information to the prediction system 1, the prediction system 1 outputs the condition of the joint of the human subject at the second point in time (first prediction information). The prediction system 1 outputs information (third prediction information) indicating the effect of the intervention when lifestyle guidance or the like is applied to the human subject. The user can use various kinds of information output by the prediction system 1 to present a more preferable intervention, such as lifestyle guidance, to the human subject. The human subject can accept the intervention more positively by knowing the effect of the intervention.

Variation

Basic Information Acquirer 22

In addition to the configuration described above, the prediction device 1 may further include a basic information acquirer 22 as illustrated in FIG. 3. The basic information acquirer 22 acquires basic information, which is information regarding the human subject, from the electronic medical record management device 5. The electronic medical record management device 5 is a computer that functions as a server for managing electronic medical record information of a human subject who is examined in the medical facility 8. In addition to the one or more terminal devices 7a and the medical image management device 6a, the electronic medical record management device 5a may be communicably connected to the LAN in the medical facility 8a. The electronic medical record information may contain basic information and medical interview information about the human subject. The basic information is input data to be input to the first prediction unit 23 in addition to the medical image. The first prediction model included in the first prediction unit 23 is capable of estimating the first prediction information based on the basic information in addition to the medical image.

The basic information is information containing the height, age, and gender of the human subject. The basic information may further contain at least one of the following: body mass index (BMI), type (e.g., race), occupational history, exercise history, history of joint disease, information regarding bone morphology or synovial fluid and synovial membrane, biomarker information, and genetic information of the human subject. The basic information may contain, for example, information contained in the electronic medical record information of the human subject. The basic information may be medical interview information acquired from the human subject through the medical interview conducted in the medical facility 8 or the like, and may contain, for example, information regarding the QOL of the human subject at the first point in time.

When the first prediction unit 23 uses the basic information as input data, upon training the first prediction unit 23, the first learning unit 27 may input the symptom information and attribute information of the patient to the first prediction unit 23 as the first learning input data 321 in addition to the medical image of the patient at a certain point in time.

According to the configuration described above, the prediction device 1 acquires the basic information of the human subject from the electronic medical record management device 5 in addition to the medical image, and transmits the first prediction information regarding the joint of the human subject Pa to the terminal device 7a installed in the medical facility 8a. In the same or similar manner, the prediction device 1 can acquire a medical image and basic information of the human subject Pb who is examined in the medical facility 8b, and can transmit first prediction information regarding the joint of the human subject Pb to the terminal device 7b installed in the medical facility 8b.

In addition to the first prediction unit 23 and the second prediction unit 25, the prediction device 1 may further include a third prediction unit 26 that outputs fourth prediction information. The prediction device 1 may include a third learning unit 29 that executes learning processing of the third prediction unit 26. Here, the fourth prediction information is clinical outcome information of the human subject at a third point in time, which is a point in time after a predetermined period of time from the application of the intervention when the intervention is applied. The third prediction unit 26 can be generated by machine learning using the same second learning data 33 as the second prediction unit 25. However, the third prediction unit 26 is a neural network that outputs output data different from the second prediction unit 25. The third prediction unit 26 includes a third prediction model generated based on the time series data (clinical outcome information) regarding the intervention method, which is contained in the second learning data 33 and acquired from a plurality of individual patients to whom a certain intervention was applied in the past at a plurality of points in time in the past. The third prediction unit 26 executes operations using the third prediction model based on the first prediction information and the intervention information 34, and outputs the fourth prediction information regarding the clinical outcome of the human subject at the third point in time after the intervention.

The clinical outcome information is information of a patient for whom a surgical treatment was performed. Examples of the surgical treatment include arthroscopic surgery, joint-sparing surgery (e.g., osteotomy), and replacement arthroplasty. Examples of the clinical outcome information include pain, joint stiffness, articular range of motion, walking ability, and periarticular alignment. The clinical outcome information in arthroscopic surgery includes the presence or absence of synovitis and the presence or absence of locking symptoms due to loose bodies or the like, but is not limited thereto. The clinical outcome information in replacement arthroplasty includes pain, articular range of motion, and walking ability.

The third prediction unit 26 may also have the same or similar configuration as the first prediction unit 23, and specifically includes an input layer 261 and an output layer 262. The third prediction unit 26 outputs, as the fourth prediction information, for example, the clinical outcome of a certain intervention applied at the point in time A at the point in time B.

The third learning unit 29 trains the third prediction unit 26. The flow of learning processing executed in the third learning unit 29 is the same as or similar to the pieces of processing executed in the first learning unit 27 and the second learning unit 28. However, the third learning unit 29 inputs the symptom information of a certain patient A at the point in time B and the information indicating a certain intervention X, contained in the second learning data 33, to the third prediction unit 26 as input data. The third learning unit 29 outputs, based on the input data, the clinical outcome of the intervention X at the point in time B to the third learning unit 29 as output data, when the intervention X is applied. The third learning unit 29 compares the output data with the clinical outcome information of the intervention X at the point in time B contained in the second learning data 33, and adjusts the third prediction model.

In addition to the first prediction information, the second prediction information, and the third prediction information, the output controller 24 may output information of the human subject at the time of imaging. Specifically, the output controller 24 may output a medical image, information regarding the joint-related symptom, information indicating the progression stage of the symptom, and the like, of the human subject at the first point in time.

Second Embodiment

Hereinafter, a case where the prediction device 1 is applied to predict information regarding knee osteoarthritis (hereinafter referred to as KOA) will be described. KOA is a disease that causes abnormalities in the shape and cartilage of the knee joint, resulting in gradual deformity of the knee joint. The number of KOA patients in Japan is estimated to be approximately 24 million. About one third of these patients have knee pain. When KOA develops and the symptoms worsen, the patient may need to undergo total knee arthroplasty.

It is important to initiate interventions, such as lifestyle guidance, as early as possible in order to prevent the onset of KOA and suppress the progression of symptoms. By applying the prediction device 1 according to the aspect of the present disclosure, the timing of the onset of KOA and the transition of symptoms can be predicted.

The following are specific examples of the various data when the prediction device 1 is applied to the prediction of the information regarding KOA.

In this case, the input data input to the input layer 231 is a medical image at a first point in time. The first point in time is, for example, a point in time when the current knee condition of the human subject is examined in the medical facility 8. In addition to the medical image, basic information of the human subject at the first point in time may be input to the input layer 231.

The medical image may be, for example, at least one selected from the group consisting of a lower limb X-ray photograph (X-ray image), a lower limb CT photograph (CT image), a lower limb MRI photograph (MRI image), and a lower limb ultrasound image taken of the human subject at the first point in time. The X-ray image may be at least one selected from the group consisting of a standing front view, a front view, a side view, a Rosenberg view, and an axial view of the patella. A positioner may be used to hold the knee in place during imaging.

The basic information may contain information indicating the height, weight, age, and gender of the human subject at the first point in time. The basic information may further contain at least one of the following pieces of information.

Type (e.g., race), presence or absence of injury or disease, type of injury or disease, occupation, occupational history, lifestyle, exercise habits, exercise history, smoking habits, information about bone morphology, genetic information, composition of knee synovial fluid, lower limb muscle mass, quadriceps femoris muscle strength, frequency of use of walking aids, use or non-use of medication, use or non-use of anti-inflammatory drugs, information about pain developing in the knee (e.g., presence or absence of pain), information about the knee articular range of motion, information about the motor ability (walking ability) of the human subject, information indicating the level of life satisfaction of the human subject, history of joint disease, biomarker information, and a value indicating a class according to the degree of deformity of the knee joint (e.g., KL classification or Koshino classification).

The information indicating the level of life satisfaction of the human subject may be a score as a result of a diagnosis regarding the human subject's QOL. Examples of methods of evaluating the score include SF-36, WOMAC, International Knee Documentation Committee (IKDC), Knee injury and Osteoarthritis Outcome Score (KOOS), and Japanese knee osteoarthritis measure (JKOM).

The genetic information may contain information regarding at least one selected from the group consisting of a gene encoding asporin, a gene encoding GDF5, and a gene encoding DVWA. These are pieces of information regarding genes that may be associated with the progression of KOA.

Examples of injuries or diseases include a meniscus injury, anterior cruciate ligament injury, posterior cruciate ligament injury, and trauma.

First Learning Data 32

In the present embodiment, the first learning data 32 is time series data regarding knee-joint-related symptoms acquired from a plurality of individual patients with diseases of the knee joints at a plurality of points in time in the past. The first learning data 32 may contain the following (1) to (3) of the plurality of individual patients.

(1) Patient image showing the knee joint
(2) Symptom information regarding the onset of the disease or progression of the knee-joint-related symptom at the time the patient image was taken
(3) Information associated with the patient-related information regarding QOL at the time the patient image was taken.

As an example, among the data contained in the first learning data 32, the first learning unit 27 may use the patient image at a certain point in time as the first learning input data 321, and use the patient image, the symptom information, and the patient-related information of the patient after a predetermined period of time from the point in time as the first teacher data 322.

First Prediction Information

The first prediction unit 23 outputs the first prediction information in response to the input of the above-described input data. The first prediction information may contain at least one of the following pieces of information.

A value indicating the class (e.g., KL classification) according to the stage of deformity of the knee joint of the human subject at the second point in time The range of motion of the knee of the human subject at the second point in time The width of the knee joint fissure of the human subject at the second point in time The angle between the femur and tibia (femoro-tibial angle) of the human subject at the second point in time When the onset of pain in the knee of the human subject occurs and the degree of pain When the human subject becomes unable to walk When invasive treatment is required for the knee of the human subject The information output as the first prediction information may be any information that can be predicted by the first prediction model, and is not limited to the pieces of information described above.

Second Learning Data 33

In the present embodiment, the second learning data 33 is time series data of a medical image when an intervention is applied. The second learning data 33 may contain basic information of the patient to whom the intervention was applied.

The second prediction unit 25 outputs, for each intervention, the third prediction information indicating the estimation result of the effect of the intervention using the second prediction model. Here, the third prediction information output by the second prediction unit 25 is, for example, the degree of deformity or the presence or absence and degree of pain in the knee joint of the human subject at the second point in time when a certain intervention is applied. The second prediction unit 25 may generate an image showing the condition of the knee of the human subject at the second point in time when the intervention is applied, and may output the image as the third prediction information.

When changing exercise habits is selected as the method of intervention, the second prediction unit 25 may predict and output the muscle mass, muscle strength, and muscle balance of the lower limb necessary for suppressing deformity of the knee. When arthroscopic surgery is selected as the method of intervention, the second prediction unit 25 may predict and output the extent of osteophyte resection necessary for suppressing deformity of the knee. When osteotomy is selected as the method of intervention, the second prediction unit 25 may predict and output the alignment correction necessary for suppressing deformity of the knee.

Method of Intervention with Estimated Effect

In the present embodiment, the method of intervention contained in the intervention information 34 stored in the storage 3 is, for example, a non-invasive treatment. Examples of the intervention include weight restriction, heat therapy, ultrasound therapy, exercise therapy, stimulation therapy, manual therapy, high frequency therapy, drug intake (drug administration), supplement intake, and wearing of an orthotic device. Examples of the orthotic device include a walking aid, a supporter, and a sole plate.

Examples of the supplement include chondroitin and glucosamine. Examples of the drug include a non-steroidal anti-inflammatory drug, acetaminophen, a cyclooxygenase (COX)-2 inhibitor, and sodium chondroitin sulfate. Examples of the method of intervention include intra-articular injection, surgical therapy, and invasive treatment. Examples of infra-articular injection include hyaluronic acid, steroid, and regenerative medicine products (such as plate rich plasma (PRP), mesenchymal stem call (MSC), and multi-lineage differentiating stress enduring cell (Muse cell)). Examples of the surgical therapy include arthroscopic surgery, meniscus repair and meniscectomy, ligament reconstruction, osteotomy (high tibial osteotomy (HTO), etc.), cartilage regeneration surgery, and total knee arthroplasty.

The second prediction unit 25 selects at least one of the methods of intervention and estimates the effect of the intervention. The second prediction unit 25 may estimate the effect when a plurality of the interventions are applied in combination.

Variation

The controller 2 of the prediction device 1 may extract new basic information from a medical image. For example, the controller 2 may measure at least one of the following based on a medical image.

From the image, an angle formed by the femur and tibia (femoro-tibial angle), lower limb muscle mass, articular cartilage thickness, bone marrow lesion, subchondral bone cyst, recess, osteophyte formation, meniscus injury, cruciate ligament injury, synovitis, osteosclerosis, changes in ligament tension, joint contractures, bone density of the medial or lateral subchondral bone of the femur, bone density of the medial or lateral subchondral bone of the tibia, trabecular bone structure of the medial or lateral subchondral bone of the tibia, bone density of the medial or lateral subchondral bone of the tibia, and the vascularity of the medial or lateral subchondral bone of the tibia can be measured.

The result measured by the controller 2 may be used as basic information to be input to the first prediction unit 23.

The controller 2 may measure the joint fissure from the X-ray photograph of the lower limb of the human subject and use the measurement result as the basic information to be input to the first prediction unit 23. The controller 2 may measure the external knee adduction moment of the human subject and detect the presence or absence of lateral thrust from a video of the human subject walking, and use the detection result as basic information to be input to the first prediction unit 23.

According to the configuration, the prediction device 1 can make a prediction based on more input data, thereby improving the accuracy of the first prediction information.

The prediction device 1 may include the third prediction model generated based on time series data (clinical outcome information) regarding an intervention. The clinical outcome information is information of a patient for whom a surgical treatment was performed. Examples of the surgical treatment include arthroscopic surgery, osteotomy, and replacement arthroplasty. Examples of the clinical outcome information include pain, joint stiffness, articular range of motion, walking ability, and periarticular alignment (varus-valgus alignment and rotation alignment). The clinical outcome information in arthroscopic surgery includes the presence or absence of synovitis and the presence or absence of locking symptoms due to loose bodies, but is not limited thereto. The clinical outcome information in osteotomy includes the femoro-tibial angle, % MA (Mikulicz line), and patellofemoral joint pressure but is not limited thereto. The clinical outcome information in total knee arthroplasty includes pain, articular range of motion, and walking ability.

Third Embodiment

Hereinafter, a case where the prediction device 1 is applied to predict information regarding hip osteoarthritis (hereinafter referred to as HOA) will be described. For convenience of description, a member having the same function as that of a member described in the embodiments described above is denoted by the same reference sign, and description thereof will not be repeated.

HOA is a disease that causes abnormalities in the shape and cartilage of the hip joint, resulting in gradual deformity of the hip joint. The prevalence of HOA in Japan is estimated to be approximately 1% to 5% of the population. When HOA develops and the symptom worsens, the patient may need to undergo total hip arthroplasty.

It is important to initiate interventions, such as lifestyle guidance, as early as possible in order to prevent the onset of HOA and suppress the progression of the symptom. By applying the prediction device 1 according to the aspect of the present disclosure, the timing of the onset of HOA and the transition of symptoms can be predicted.

Hereinafter, specific examples of the various data when the prediction device 1 is applied to the prediction of the information regarding HOA will be described.

In this case, the input data input to the input layer 231 is a medical image at a first point in time. The first point in time here is a point in time when the current hip joint condition of the human subject can be grasped. For example, the first point in time is the point in time when the human subject visits the hospital. In addition to the medical image, basic information of the human subject at the first point in time may be input to the input layer 231.

The medical image in this case is an image used as input data to execute operations on the deformity of the hip joint of the human subject. The medical image is, for example, at least one selected from the group consisting of an X-ray photograph (X-ray image), a CT photograph (CT image), an MRI photograph (MRI image), and an ultrasound image taken around the hip joint of the human subject at the first point in time.

The basic information may contain information indicating the height, weight, age, and gender of the human subject at the first point in time. The basic information may further contain at least one of the following pieces of information.

Type (e.g., race), presence or absence of injury or disease, type of injury or disease, occupation, occupational history, lifestyle, exercise habits, exercise history, smoking habits, information about bone morphology, genetic information, composition of synovial fluid, lower limb muscle mass, frequency of use of walking aids, use or non-use of medication, use or non-use of anti-inflammatory medication, information about pain developing in the hip joint (e.g., presence or absence of pain), information about hip articular range of motion, information about the motor ability (walking ability) of the human subject, information indicating the level of life satisfaction of the human subject, history of joint disease, biomarker information, and a value indicating a class according to the degree of deformity of the hip joint (e.g., KL classification).

The genetic information may contain information regarding CALM1 and/or CALM2, which are genes encoding calmodulin, GDF5, and the gene that encodes asporin. These are pieces of information regarding genes that may be associated with the progression of HOA.

The history of joint disease may be, for example, acetabular dysplasia or developmental dysplasia of the hip. The diagnosis of developmental dysplasia of the hip may be made by using an X-ray image or an ultrasound image. When X-ray photography and ultrasound diagnosis are not feasible, the diagnosis may be made by using a photograph or a video. A neural network may be used for diagnosis. The neural network may be trained with photographs, videos, X-ray images, or ultrasound images of a plurality of patients with developmental dysplasia of the hip.

First Learning Data 32

In the present embodiment, the first learning data 32 is time series data regarding the hip-joint-related symptoms acquired from a plurality of individual patients with diseases of the hip joints at a plurality of points in time in the past. The first learning data 32 may contain the following (1) to (3) of the plurality of individual patients.

(1) The patient image showing the hip joint
(2) Symptom information regarding the onset of the disease or progression of the hip-joint-related symptom at the time the patient image was taken
(3) Information associated with the patient-related information regarding QOL at the time the patient image was taken As an example, among the data contained in the first learning data 32, the first learning unit 27 may use the patient image at a certain point in time as the first learning input data 321, and use the patient image, the symptom information, and the patient-related information of the patient after a predetermined period of time from the point in time as the first teacher data 322.

First Prediction Information

The first prediction unit 23 outputs the first prediction information in response to the input of the above-described input data. The first prediction information may contain at least one of the following pieces of information.

A value indicating the class (e.g., KL classification) according to the stage of deformity of the hip joint of the human subject at the second point in time The hip articular range of motion of the human subject at the second point in time When the onset of pain in the hip joint of the human subject occurs and the degree of pain When the human subject becomes unable to walk When invasive treatment is required for the hip joint of the human subject The information output as the first prediction information may be any information that can be predicted by the first prediction model, and is not limited to the pieces of information described above.

Second Learning Data 33

In the present embodiment, the second learning data 33 is time series data of a medical image when an intervention is applied. The second learning data 33 may contain basic information of the patient to whom the intervention was applied.

The second prediction unit 25 outputs, for each intervention, the third prediction information indicating the estimation result of the effect of the intervention using the second prediction model. Here, the third prediction information output by the second prediction unit 25 is, for example, the degree of deformity or the presence or absence and degree of pain in the hip joint of the human subject at the second point in time when the intervention is applied. The second prediction unit 25 may generate an image showing the condition of the hip joint of the human subject at the second point in time when the intervention is applied, and may output the image as the third prediction information.

Method of Intervention with Estimated Effect

In the present embodiment, the method of intervention contained in the intervention information 34 stored in the storage 3 is, for example, a non-invasive treatment. Examples of the method of intervention include weight restriction, heat therapy, ultrasound therapy, exercise therapy, stimulation therapy, manual therapy, high frequency therapy, drug intake (drug administration), supplement intake, wearing of an orthotic device, and patient education. Examples of the orthotic device include a walking aid and a supporter.

Examples of the supplement include chondroitin and glucosamine. Examples of the drug include a non-steroidal anti-inflammatory drug, acetaminophen, a COX-2 inhibitor, and sodium chondroitin sulfate. Examples of the method of intervention include intra-articular injection, surgical therapy, and invasive treatment. Examples of intra-articular injection include hyaluronic acid, steroid, and regenerative medicine products (such as PRP, MSC, and Muse cell). Examples of the surgical therapy include arthroscopic surgery, rotational acetabular osteotomy (RAO), and total hip arthroplasty.

The second prediction unit 25 selects at least one of the methods of intervention and estimates the effect of the intervention. The second prediction unit 25 may estimate the effect when a plurality of methods of intervention are applied in combination.

Fourth Embodiment

Hereinafter, a case where the prediction device 1 is applied to predict information regarding idiopathic osteonecrosis of a femoral head (hereinafter referred to as "ION") will be described. For convenience of description, a member having the same function as that of a member described in the embodiments described above is denoted by the same reference sign, and description thereof will not be repeated.

ION is an intractable disease in which the femoral head undergoes avascular necrosis and collapses, resulting in loss of the hip joint function. ION accounts for 7% of all diseases that require total hip arthroplasty. ION develops in approximately 1 in 5000 people in Japan. Systemic steroid administration, drinking habits, smoking habits, and the like are suspected as factors related to the onset of ION.

ION often develops between the ages of 30 to 40, resulting in a decline in the workforce. When ION develops, long-term treatment is required. Patients with advanced symptoms of ION and collapse of the femoral head may need to undergo total hip arthroplasty.

In the aspect of the present disclosure, the prediction device can predict a period of time until the onset of ION.

In the aspect of the present disclosure, the prediction device can predict the transition of symptoms of ION and the period of time until the femoral head collapses.

In this case, the input data input to the input layer 231 is a medical image at a first point in time. The first point in time here is a point in time when the current hip joint condition of the human subject can be grasped. For example, the first point in time is the point in time when the human subject visits the hospital. In addition to the medical image, basic information of the human subject at the first point in time may be input to the input layer 231.

In this case, the medical image may be, for example, at least one selected from the group consisting of an X-ray photograph (X-ray image), a CT photograph (CT image), an MRI photograph (MRI image), and an ultrasound image taken around the hip joint of the human subject at the first point in time.

The basic information contains at least one selected from the group consisting of, for example, gender, age, height, weight, type (e.g., race), occupation, occupational history, lifestyle, exercise habits, exercise history, smoking habits, drinking habits, use or non-use of steroids, information regarding bone morphology, genetic information, information regarding pain and stiffness developing in the hip joint (e.g., presence or absence or degree of pain and stiffness), and biomarker information of the human subject at the first point in time.

First Learning Data 32

In the present embodiment, the first learning data 32 is time series data regarding the symptoms of ION acquired from a plurality of individual patients diagnosed as ION at a plurality of points in time in the past. The first learning data 32 contains information that is associated with pieces of information for a plurality of individual patients. These pieces of information are, for each patient, a patient image showing the hip joint, symptom information regarding the onset of the disease or progression of the hip-joint-related symptom at the time the patient image was taken, and patient-related information regarding the QOL at the time the patient image was taken. The first learning data 32 may contain information indicating when the collapse of the femoral head occurred.

As an example, among the data contained in the first learning data 32, the first learning unit 27 may use the patient image at a certain point in time as the first learning input data 321, and use the patient image, the symptom information, and the patient-related information of the patient after a predetermined period of time from the point in time as the first teacher data 322.

First Prediction Information

The first prediction unit 23 outputs the first prediction information in response to the input of the above-described input data. The first prediction information may contain at least one of the following pieces of information.

The degree of pain in the hip joint of the human subject at the second point in time The hip articular range of motion of the human subject at the second point in time When the onset of pain in the hip joint of the human subject occurs When the bone head of the human subject collapses When the human subject becomes unable to walk When invasive treatment is required for the hip joint of the human subject For example, the first prediction unit 23 outputs the degree of pain in the hip joint of the human subject after five years as the first prediction information.

The information output as the first prediction information may be any information that can be predicted by the first prediction model, and is not limited to the pieces of information described above.

Second Learning Data 33

In the present embodiment, the second learning data 33 is time series data of a medical image when an intervention is applied. The second learning data 33 may contain basic information of the patient to whom the intervention was applied.

The second prediction unit 25 outputs, for each intervention, the third prediction information indicating the estimation result of the effect of the intervention using the second prediction model. Here, the third prediction information output by the second prediction unit 25 is, for example, the presence or absence and degree of pain or the presence or absence and degree of stiffness developing in the hip joint of the human subject at the second point in time when the intervention is applied. The second prediction unit 25 may generate an image showing the condition of the hip joint of the human subject at the second point in time when the intervention is applied, and may output the image as the third prediction information. The second prediction information may output the time when the femur collapse will occur in a case in which the intervention is applied as the third prediction information.

Method of Intervention with Estimated Effect

In the present embodiment, the method of intervention contained in the intervention information 34 stored in the storage 3 is, for example, a non-invasive treatment. Examples of the method of intervention include weight restriction, heat therapy, ultrasound therapy, drug intake, and wearing of an orthotic device. Examples of the orthotic device include a walking aid and a supporter.

The drug may be, for example, a statin hypolipidemic drug.

Examples of the method of intervention include intra-articular injection, surgical therapy, and invasive treatment. The surgical therapy may be, for example, osteotomy or total hip arthroplasty.

The second prediction unit 25 selects at least one of the methods of intervention and estimates the effect of the intervention. The second prediction unit 25 may estimate the effect when a plurality of methods of intervention are applied in combination.

Example of Implementation by Software

A control block of the prediction device 1 (particularly, the image acquirer 21, the basic information acquirer 22, the first prediction unit 23, the output controller 24, the second prediction unit 25, the first learning unit 27, and the second learning unit 28) may be implemented by a logic circuit (hardware) formed in an integrated circuit (IC chip) or the like, or may be implemented by software.

In the latter case, the prediction device 1 includes a computer that executes instructions of a program that is software that implements each function. The computer includes, for example, one or more processors and a computer-readable recording medium that stores the above program. In the computer, the processor reads the above program from the recording medium and executes the read program to achieve the object of the present disclosure. As the processor, a central processing unit (CPU) can be used, for example. As the recording medium, a "non-transitory tangible medium" such as a tape, a disk, a card, a semiconductor memory, a programmable logic circuit as well as a read only memory (ROM) can be used. A random access memory (RAM) for developing the above program may be further provided. The above program may be supplied to the computer via any transmission medium (communication network, broadcast wave, and the like) capable of transmitting the program. The aspect of the present disclosure may be implemented in the form of data signals embedded in a carrier wave in which the above program is embodied by electronic transmission.

The invention according to the present disclosure has been described above based on the drawings and examples. However, the invention according to the present disclosure is not limited to each embodiment described above. That is, the invention according to the present disclosure can be variously modified within the scope indicated in the present disclosure, and an embodiment to be obtained by appropriately combining technical means disclosed in different embodiments is also included in the technical scope of the invention according to the present disclosure. In other words, it should be noted that a person skilled in the art can easily make various variations or modifications based on the present disclosure. Note that these variations or modifications are included within the scope of the present disclosure.

REFERENCE SIGNS

1 Prediction device
21 Image acquirer
22 Basic information acquirer
23 First prediction unit
24 Output controller
25 Second prediction unit
26 Third prediction unit
32 First learning data (patient information)
33 Second learning data (effect information)
100a, 100b Prediction system
S21 Image acquisition step
S23 Prediction Step

The invention claimed is:

1. A prediction system for predicting a disease of a joint of a subject comprising:
an image acquisition device configured to acquire a medical image showing a joint of a subject at a first point in time;
a first prediction unit configured to output first prediction information regarding the joint at a second point in time after a predetermined period of time from the first point in time, wherein the first prediction unit comprises a first prediction model configured to estimate the first prediction information from the medical image, the first prediction unit further configured to output the first prediction information to a display of a terminal device; and
a second prediction unit configured to output third prediction information indicating a method of intervention in the subject and an effect of the intervention, wherein the second prediction unit comprises a second prediction model configured to estimate the third prediction information from the first prediction information, the second prediction unit further configured to output the third prediction information to the display of the terminal device;
wherein the second prediction unit comprises a neural network trained using effect information as the second prediction model, the effect information being time series data regarding a joint-related symptom acquired from a plurality of individual patients to whom the interventions were applied at a plurality of past points in time.

2. The prediction system according to claim 1, further comprising:
a basic information acquirer configured to acquire basic information of the subject at the first point in time, wherein
the first prediction model is configured to estimate the first prediction information from the basic information in addition to the medical image.

3. The prediction system according to claim 2, wherein the basic information comprises at least one selected from the group consisting of height, weight, age, and gender of the subject.

4. The prediction system according to claim 2, wherein the basic information further comprises at least one selected from the group consisting of information regarding type, occupational history, exercise history, history of joint disease, bone morphology, biomarker information, and genetic information of the subject.

5. The prediction system according to claim 2, wherein the basic information comprises information regarding quality of life (QOL) of the subject at the first point in time.

6. The prediction system according to claim 5, wherein the information regarding QOL comprises at least one selected from the group consisting of information regarding pain developing in the joint, information regarding motor ability of the subject, and information indicating a level of life satisfaction of the subject.

7. The prediction system according to claim 1, wherein the first prediction information is information comprising an onset of a disease or a progression stage of a symptom regarding the joint up to the second point in time.

8. The prediction system according to claim 1, wherein the first prediction information is information comprising a progression stage of a symptom of a disease related to the joint up to the second point in time, and
the progression stage of the symptom is periarticular alignment, thickness of articular cartilage, Kellgren-Laurence (KL) classification, articular range of motion, joint stiffness, and presence or absence of claudication.

9. The prediction system according to claim 1, wherein the first prediction unit comprises a neural network trained using patient information as the first prediction model, the patient information being time series data regarding a joint-related symptom acquired from a plurality of individual patients at a plurality of past points in time.

10. The prediction system according to claim 9, wherein the patient information comprises patient images for the plurality of individual patients showing joints and symptom information regarding the joints at points in time when the patient images were taken.

11. The prediction system according to claim 10, wherein each patient image of the patient images comprises at least one selected from the group consisting of an X-ray image, a CT image, an MRI image, and an ultrasound image showing each of the joints of the plurality of individual patients.

12. The prediction system according to claim 1, wherein the first prediction unit is configured to further output second prediction information regarding quality of life (QOL) of the subject at the second point in time, and the first prediction model is configured to estimate the second prediction information from the medical image.

13. The prediction system according to claim 12, wherein the second prediction information comprises at least one selected from the group consisting of pain in the joint, information regarding catastrophizing by the subject, information regarding motor ability of the subject, and information indicating a level of life satisfaction of the subject.

14. The prediction system according to claim 1, wherein the third prediction information comprises information regarding a time at which the intervention is applied.

15. The prediction system according to claim 1, wherein the effect information comprises information indicating when the interventions were applied for the plurality of individual patients, patient images showing joints, and symptom information regarding onsets or progressions of joint-related symptoms at points in time when the patient images were taken.

16. A non-transitory computer-readable storage medium storing a control program, the control program configured for operating a computer to function as the prediction device according to claim 1, and for causing the computer to function as the image acquirer and the first prediction unit.

17. A control method executed by a computer for predicting a disease of a joint of a subject, the control method comprising:
acquiring a medical image showing a joint of a subject at a first point in time;
using a first prediction model to estimate first prediction information regarding the joint at a second point in time after a predetermined period of time from the first point in time based on the medical image;
outputting the first prediction information to a display of a terminal device;
using a second prediction model to estimate third prediction information from the first prediction information indicating a method of intervention in the subject and an effect of the intervention, wherein the second prediction model comprises a neural network trained using effect information comprising time series data regarding a joint-related symptom acquired from a plurality of individual patients to whom the interventions were applied at a plurality of past points in time; and
outputting the third prediction information to the display of the terminal device.

18. A prediction system for predicting a disease of a joint of a subject comprising:
an image acquisition device configured to acquire a medical image showing a joint of a subject at a first point in time;
a first prediction unit configured to output first prediction information regarding the joint at a second point in time after a predetermined period of time from the first point in time, wherein the first prediction unit comprises a first prediction model configured to estimate the first prediction information from the medical image, the first prediction unit further configured to output the first prediction information to a display of a terminal device;
a second prediction unit configured to output third prediction information indicating a method of intervention in the subject and an effect of the intervention, wherein the second prediction unit comprises a second prediction model configured to estimate the third prediction information from the first prediction information, the second prediction unit further configured to output the third prediction information to the display of the terminal device; and
a third prediction unit configured to output fourth prediction information regarding clinical outcome of the subject after the intervention is applied at a third point in time after another predetermined period of time from a point in time when the intervention is applied, from the first prediction information and the intervention, using a third prediction model generated based on clinical outcome information, the clinical outcome information being time series data regarding the intervention obtained from a plurality of individual patients to whom the interventions were applied at a plurality of past points in time.

* * * * *